United States Patent

[11] 3,609,035

[72] Inventor Hisanori Ataka
Kawasaki-shi, Japan

[21] Appl. No. 885,694
[22] Filed Dec. 17, 1969
[45] Patented Sept. 28, 1971
[73] Assignee Kabushiki Kaisha Ricoh
Tokyo, Japan
[32] Priority Dec. 30, 1968
[33] Japan
[31] 43/96549

[54] METHOD AND DEVICE FOR RECORDING CHARACTERS OR SYMBOLS IN A REPRODUCIBLY INDISCERNIBLE MANNER
3 Claims, 9 Drawing Figs.

[52] U.S. Cl. .......... 355/40,
95/36, 95/12.21, 355/52, 355/77
[51] Int. Cl. .......... G03b 27/52
[50] Field of Search .......... 95/36,
12.21; 355/52, 33, 77, 40

[56] References Cited

UNITED STATES PATENTS

| | | | |
|---|---|---|---|
| 1,000,323 | 8/1911 | Butler | 95/36 |
| 1,858,661 | 5/1932 | Decker | 95/18 P |
| 3,166,625 | 1/1965 | Brumley | 95/12.21 |
| 3,425,770 | 2/1969 | Mueller et al. | 95/36 |

*Primary Examiner*—Samuel S. Matthews
*Assistant Examiner*—D. J. Clement
*Attorney*—Burgess, Ryan & Hicks

ABSTRACT: A method and device for recording characters or symbols in a reproducibly indiscernible manner, in which adjacent to a lens plate having a plurality of lenses is disposed a key pattern plate having at least one light shielding portion which covers some of the lenses of said lens plate and the remaining portion of said key pattern plate made transparent when a camouflaging or concealing original or object is recorded; thereafter, a true original is recorded without said key pattern plate, thereby forming a camouflaged or concealing photograph; and to read out or reproduce the camouflaged photograph, instead of said key pattern plate is disposed a decoding plate having the light shielding and transparent portions complementary to those of said key pattern plate when said camouflaged photograph is projected.

METHOD AND DEVICE FOR RECORDING CHARACTERS OR SYMBOLS IN A REPRODUCIBLY INDISCERNIBLE MANNER

BACKGROUND OF THE INVENTION

The present invention relates to a method and device for reproducibly concealing or making indiscernible characters or symbols to be recorded and more particularly to a method and device for accomplishing the above-described purpose by use of a group of minute lenses and a key pattern plate.

It is one of the most effective methods for preventing the leakage of secrets to make indiscernible or intangible the characters, symbols and the like recorded upon the secret documents, drawings, signature cards, etc., so that they may not be read out or discernible by the conventional method without use of the special method. Among the above-described methods, for example there has been known the method for the signature cards in which each signature is finely split through a plurality of minute prisms. But in this method, it is very difficult to vary the combinations of those prisms so that it is not an effective or advantageous method which can be utilized in practice.

It is the primary object of the present invention to provide a method and device for making reproducibly indiscernible or intangible the documents, drawings, signature cards, etc. (which are referred to as "true original" hereinafter) by a simple optical method, thereby preventing the leakage of secrets.

SUMMARY OF THE INVENTION

The present invention utilizes a lens plate having a plurality of lenses and a key pattern plate having at least one light shielding portion which covers some of the lenses of the lens plate and the remaining portion made transparent. The key pattern plate is disposed adjacent to the lens plate so that a camouflaging object (which serves to make the recorded image of the true original more completely indiscernible as will be described in more detail hereinafter) may be recorded upon a sensitized sheet upon which the image of the true original is also recorded with the key pattern plate removed. It is understood that the term "true original" implies the characters, symbols, etc., which are desired to be recorded permanently. The camouflaging object is an original which is recorded upon the recorded image of the true original in superposed relation therewith in order to make the image of the true original indiscernible or intangible. The key pattern plate or coding plate has the light shielding or opaque sections or portions located at arbitrary portions thereof and the remaining portions made transparent. When the different true originals are used, the different key pattern plates having the different light shielding or opaque portion patterns or combinations are used.

When both of the true original and camouflaging object are recorded, the split images and others of the true original are distributed and recorded upon the area of the sensitized sheet corresponding to the above-described light shielded or opaque portion of the key pattern plate while over other area of the sensitized sheet corresponding to the transparent portions of the key pattern plate both of the true original and camouflaging object are recorded in superposed relation with each other. Thus, it is impossible to discern the images of the true originals from the sensitized sheet. Especially when the camouflaging object has the characters or symbols similar to those of the true original, the camouflaged recorded images become more indiscernible.

To reproduce the image of the true original from the camouflaged image thereof, the lens plate described above and a decoding plate having the light-shielded or opaque portion and transparent portion complementary to those of the above-described key pattern plate are utilized. That is, when the camouflaged photograph or the like processed in a manner described above is projected through the lens plate and the decoding plate, the split images of the true original may be projected through the transparent portion of the decoding plate upon a screen.

According to the present invention, the perfect camouflaged photographs or the like may be obtained and there is provided a large number of key pattern plates having different key patterns. The present invention is, therefore, very advantageously applied for example to the signature card system. Another advantage of the present invention is that even when a part of the camouflaged photograph or the like is torn off, the image of the true original may be reproduced from the remaining portion of the camouflaged photograph or the like to such an extent that the true original may be discernible. The method and device in accordance with the present invention are simple and bring about various excellent advantages.

The above and other objects, features and advantages of the present invention will become more apparent from the following description of some illustrative embodiments thereof with reference to the accompanying drawings.

DESCRIPTION OF THE PREFERRED EMBODIMENTS

Figure 1:
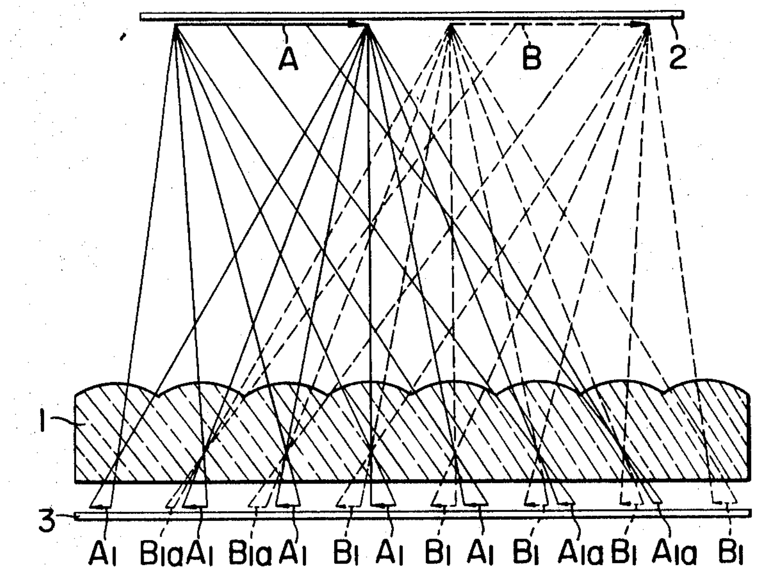
FIGS. 1, 2 and 3 are schematic views for explanation of the principle of the present invention.

Referring to FIG. 1, reference numeral 1 designates a lens plate consisting of a plurality of lenses; 2, a true original to be copied or photographed; and 3, a sensitized sheet disposed adjacent to the back surface of the lens plate 1. When the original 2 is illuminated, the light transmitted therethrough or the light reflected therefrom impinges upon the lens plate 1, so that the images such as characters or symbols A and B upon the original 2 is reduced in size, split and distributed over the sensitized sheet 3 when recorded. In the figure, the images A and B reduced in size and split are designated by $A_1$ and $B_1$ and $A_{1a}$ and $B_{1a}$ respectively. The images formed upon the sensitized sheet 3 are reduced in size, split and distributed as described above, the primary object of making the image or original indiscernible or intangible may be sufficiently achieved, but according to the present invention, the method for making original images indiscernible or intangible will be further improved by copying or photographing the characters or symbols for concealing or camouflaging the original or true characters or symbols (to be referred to as "concealing characters or symbols" hereinafter for description and brevity) upon the sensitized sheet 3 through a key or coding pattern plate (to be described in more detail with reference to FIG. 6). In order to make the original characters or symbols discernible, a decoding pattern to be described in more detail hereinafter with reference to FIG. 7 will be used.

Figure 2:
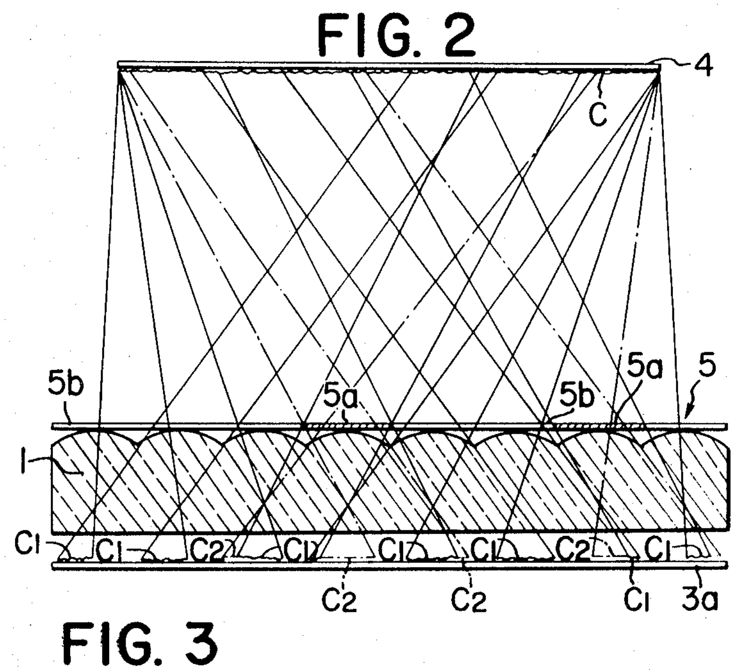
Figure 4:
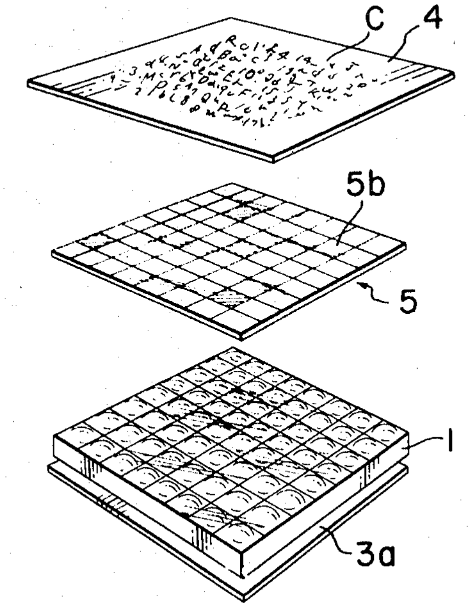
FIGS. 4 and 5 are schematic perspective views for explanation of the present invention.

The first step of the method of the present invention will be described with particular reference to FIGS. 2 and 4. In FIG. 1, a concealing or camouflaging object 4 having the concealing characters or symbols *c* (See FIG. 4 is placed in the position of the true original 2 shown in FIG. 1, and the key or coding plate 5 is disposed adjacent to the lens plate 1. The key pattern or coding plate 5 has the portions **5*a* each of which is arbitrarily selected as described in more detail hereinafter and is made opaque or light shielded and has an area sufficient enough to shield one lens of the lens plate 1 in opposed relation to said each opaque portion. The portions 5*b* except said opaque or shield portions 5*a* of the key or coding plate 5** are transparent. In the similar manner as in the case of photographing the original characters or symbols described above, the concealing or camouflaging characters or symbols *c* upon the concealing object 4 are focused upon the sensitized set **3*a* through the lens plate 1**. The images formed upon the sensitized sheet 3*a* are designated by $c_1$. It is noted that the sensitized sheet 3*a* has the unexposed portions $c_2$ because of the opaque or shield portions 5*a* of the key or coding plate 5. The essential object of the first step is to photograph or record the concealing or camouflaging characters or symbols *c* upon the sensitized sheet 3*a* through the key pattern or coding plate 5 so that the unexposed portions $c_2$ may be left upon the sensitized sheet 3*a*.

Figure 3:
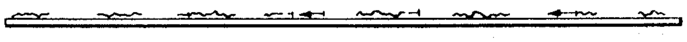
Figure 5:
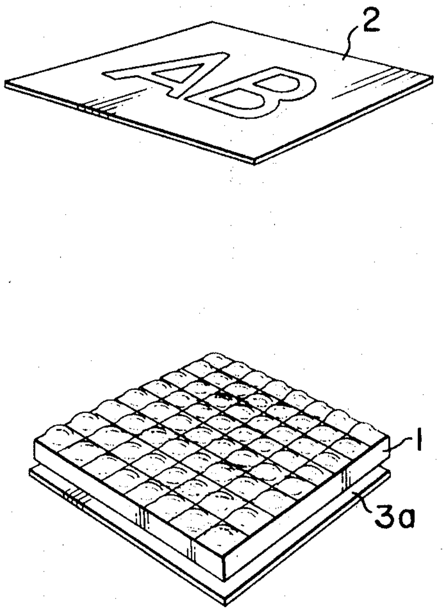

The second step is to photograph or record the original characters or symbols which are desired to be made indiscernible or intangible upon the sensitized sheet 3*a*, (which has been already exposed by the first step described above), by placing the true original 2 at the position of the concealing or camouflaging object 4 in the first step and by removing the key pattern or coding plate 5. (See FIGS. 1 and 5). Thus, the characters or symbols *A* and *B* are recorded at the unexposed portions $c_2$ of the sensitized sheet 3*a* without any interference with the images $c_1$ of the concealing or camouflaging characters or symbols, but are recorded in other portions (exposed portions) of the sensitized sheet 3*a* in superposed relation with the images of the concealing or camouflaging characters or symbols. (See FIG. 3). It will be noted that the images of the original characters or symbols cannot be discerned or read out by the conventional method and apparatus because their images are reduced in size, split and distributed over the sensitized sheet 3*a* and furthermore in some portions thereof the images of the concealing or camouflaging characters or symbols are recorded in superposed relation with the images of the original or true characters or symbols.

Next the key pattern or coding plate 5 will be described in more detail hereinafter. A number of combinations of the opaque or shield portions 5*a* of the plate 5 is dependent upon the sizes and reduction ratio of the characters or symbols to be recorded or photographed. Assume that a letter or symbol of a size of 8 mm. × 8 mm. is recorded in the width of 45 mm. with a reduction ratio of 1/5. One point of the character or symbol is recorded or photographed at 16 positions through a group of lenses of 4×4=16. Therefore, the number of combinations will be $$(4\times4)\ (8/4\times45/4)=16^{22}$$

Figure 6:
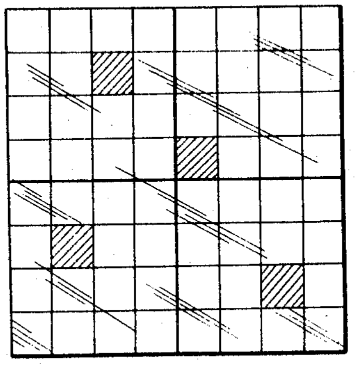
FIG. 6 is a plan view of one embodiment of a key pattern plate of the present invention.
Figure 7:
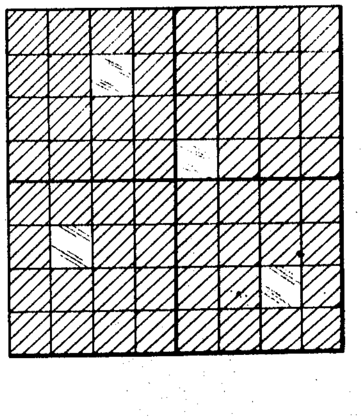
FIG. 7 is a plan view of one embodiment of a decoding plate of the present invention.

Thus, when the lens plate having 8×8=64 lenses (See FIG. 5) is used, any one of the sections corresponding to lenses of each subgroup of 16 (=4×4) lenses may be arbitrarily selected as the opaque or shield portion (See FIG. 6). The more the number of lenses of the lens plate, the more the number of combinations of the opaque or shield portions becomes available. For example, the so-called microlens plate is used, the number of combinations will be increased very much. Since each of the lenses corresponds to an object to be recorded or photographed such as the signature of each person, one device can be used in common advantageously by many people. The images of the characters or symbols thus recorded in indiscernible manner or the camouflaged images may be read out or reproduced by projecting the camouflaged images by placing the decoding plate (See FIG. 7) adjacent to the lens plate 1 instead of the key pattern or coding plate 5. As shown in FIG. 7, each section of the decoding plate 7 is made opaque or light shielded, or transparent depending upon whether its corresponding section of the key pattern or coding plate 5 is transparent or opaque or shielded.

Figure 8:
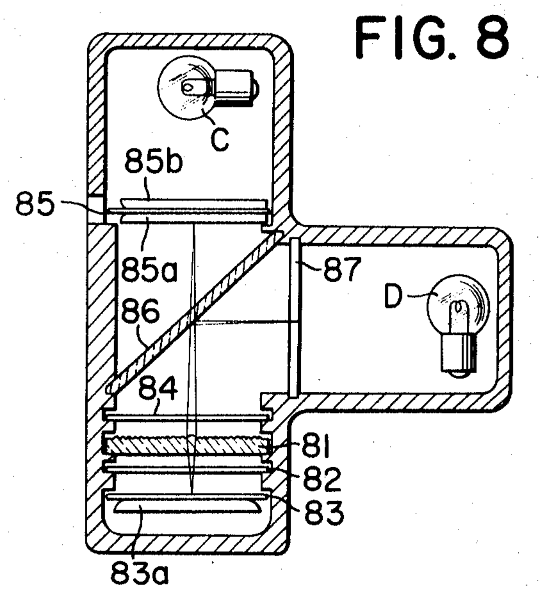
FIGS. 8 and 9 are sectional side views of two embodiments of photographically recording device of the present invention.

Next the embodiments of the photographic apparatus used in the present invention illustrated in FIGS. 8 and 9, will be described hereinafter. First referring to FIG. 8, reference numeral 81 designates a lens plate; 82 a shutter; and 83, a sensitized sheet held upon a holder 83*a*. A key pattern or coding detachably 84 is detachable mounted adjacent to the lens plate 8 forwardly thereof. A true original 85 to be recorded or photographed by the method in accordance with the present invention is placed in position by means of original-mounting members 85*a* and 85*b* spaced vertically from the lens plate 81. An illumination or projection lamp C is disposed above the original 85 so as to project it. A semitransparent reflecting mirror 86 is disposed at 45° relative to the optical axis of the lens plate 1. A concealing or camouflaging object 87 and an illumination or projecting lamp D are disposed on the right side as shown. It is preferable that the concealing or camouflaging object 87 may be detachably mounted.

In operation, the lamp D is first lighted, so tat the light transmits through the concealing or camouflaging object 87 and then is reflected by the reflecting mirror 86 and impinged upon the lens plate 1. Therefore, the concealing or camouflaging characters or symbols are recorded upon the sensitized sheet 83 through the lens plate 81 in the same manner as described above when the shutter 82 is opened. Next the key pattern or coding plate 84 is removed and the lamp D is turned off. Thereafter, the lamp C is turned on and the shutter 82 is actuated, so that the original 85 is recorded upon the sensitized sheet 83 in the same manner as described hereinabove. Thus, the complete indiscernible or camouflaged photography is provided.

Figure 9:
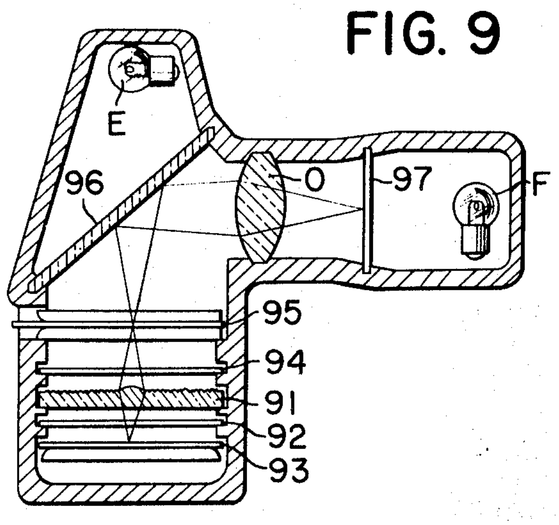

Referring to FIG. 9, a shutter 92 is disposed backwardly of a lens plate 91 and a sensitized sheet 93 is disposed backwardly of the shutter 92. An original 95 to be recorded or photographed is disposed forwardly of a key pattern or coding plate 94 which in turn is disposed forwardly of the lens plate 91. A semitransparent reflecting mirror 96 is disposed forwardly of the original 95° at 45° relative to the optical axis of the lens plate 91. Above the reflecting mirror 96 is disposed a lamp E. A projection lens O, a concealing or camouflaging original 97 and a lamp F are disposed as shown. The projection lens O is so positioned that the image of the concealing or camouflaging original 97 may be formed at the position of the original 95 through the reflecting mirror 96.

In operation, the lamp F is lighted and then the shutter 92 is actuated, so that the images of the concealing or camouflaging characters or symbols upon the concealing original 97 are recorded upon the sensitized sheet 93 through the key pattern or coding plate 94 together with the images of the characters or symbols of the original 95. Next the key pattern or coding plate 94 is detached and the lamp F is turned off. Thereafter, the lamp E is turned on and the shutter 92 is actuated, so that the characters or symbols of the original 95 are recorded upon the sensitized sheet 93. The original 95 may be dismounted when the lamp F is turned on if so desired.

One set of a key pattern or coding plate, its corresponding decoding plate and photograph are marked with the numeral or the like or punched, so that they may be readily retrieved for reproduction.

Next one example of the advantageous uses of the present invention will be described hereinafter. When the present invention is applied to the signature card system, each of the credit cards is prepared as a concealing or camouflaging object or card and the number assigned thereto is notified only to the customer. Upon withdrawal or the like, the customer is requested to identify himself by his name and card number. Thereafter, his signature card is retrieved and the name and number marked on this card are checked and the signature by the customer is checked if it coincides with the projected signature image from the concealed or camouflaged signature card. Thus, whether the customer is a right person or not can be readily checked. Furthermore, there is an advantage that the signatures signed upon the concealed or camouflaged cards will not be counterfeited or used for evil purposes. If required, the key pattern plate may be given to the customer and even if he should lose it, the key pattern plate having a combination of opaque or shielded portions of sections different from that of his lost plate may be readily made and given to him.

What is claimed is:

1. A method for photographically recording characters or symbols in a reproducibly indiscernible manner comprising the steps of:

photographically recording a concealing or camouflaging object through a lens plate having a multitude of lenses and a key pattern or coding plate which is disposed in closely spaced-apart relation with said lens plate and has at least one light shielding portion located so as to correspond to some of said lenses of said lens plate and other portions except said light shielding portion made transparent;

photographically recording through said lens plate with said key pattern plate removed, a true original to be essentially recorded and made reproducibly indiscernible, thereby forming a concealed or camouflaged photographic record; and reproducing said concealed or camouflaged record of said original through said lens plate with a decoding plate which is placed at the position of said key pattern plate in said recording and which has the light-shielded portions and transparent portions complementary to those of said key pattern plate.

2. A photographically recording device for recording characters or symbols in a reproducibly indiscernible manner comprising:

a first projection light source for projecting a true original to be recorded in a reproducibly indiscernible manner;

a true original mounting member;

a semitransparent reflecting mirror disposed at 45° relative to the optical axis of the true original projection optical system;

a key pattern plate supporting member;

a lens plate consisting of a plurality of lenses;

a shutter;

a sensitized sheet-holding member;

said light source, said original mounting member, said reflecting mirror, said key pattern plate supporting member, said lens plate, a sensitized sheet-holding member and said shutter being disposed in the order named along said optical axis, a concealing or camouflaging object mounting member and a second projection light source for projecting a camouflaging original both of which are disposed along the line perpendicular to said optical axis so that said concealing or camouflaging object may be projected upon a sensitized sheet upon said sensitized sheet holding member through said reflecting mirror, said lens plate and said shutter 3. A photographically recording device for recording characters or symbols in a reproducibly indiscernible manner comprising:

a first projection light source for projecting a true original to be recorded in a reproducibly indiscernible manner;

a semitransparent reflecting mirror disposed at 45° relative to the optical axis of the true original projection optical system;

a true original mounting member;

a key pattern plate supporting member;

a lens plate consisting of a plurality of lenses;

a shutter;

a sensitized sheet-holding member;

said light source, semitransparent reflecting mirror, said true original mounting member, said lens plate, said shutter and said sensitized sheet holding member being arranged along said optical system in the order named;

a concealing or camouflaging object projection lens, a concealing or camouflaging object mounting member and a second projection light source for projecting a camouflaging original which are so arranged along a line perpendicular relative to said optical axis that the camouflaging original upon said concealing or camouflaging object mounting member may be photographically recorded upon a sensitized sheet through said reflecting mirror, said key pattern plate, said lens plate and said shutter.